UNITED STATES PATENT OFFICE.

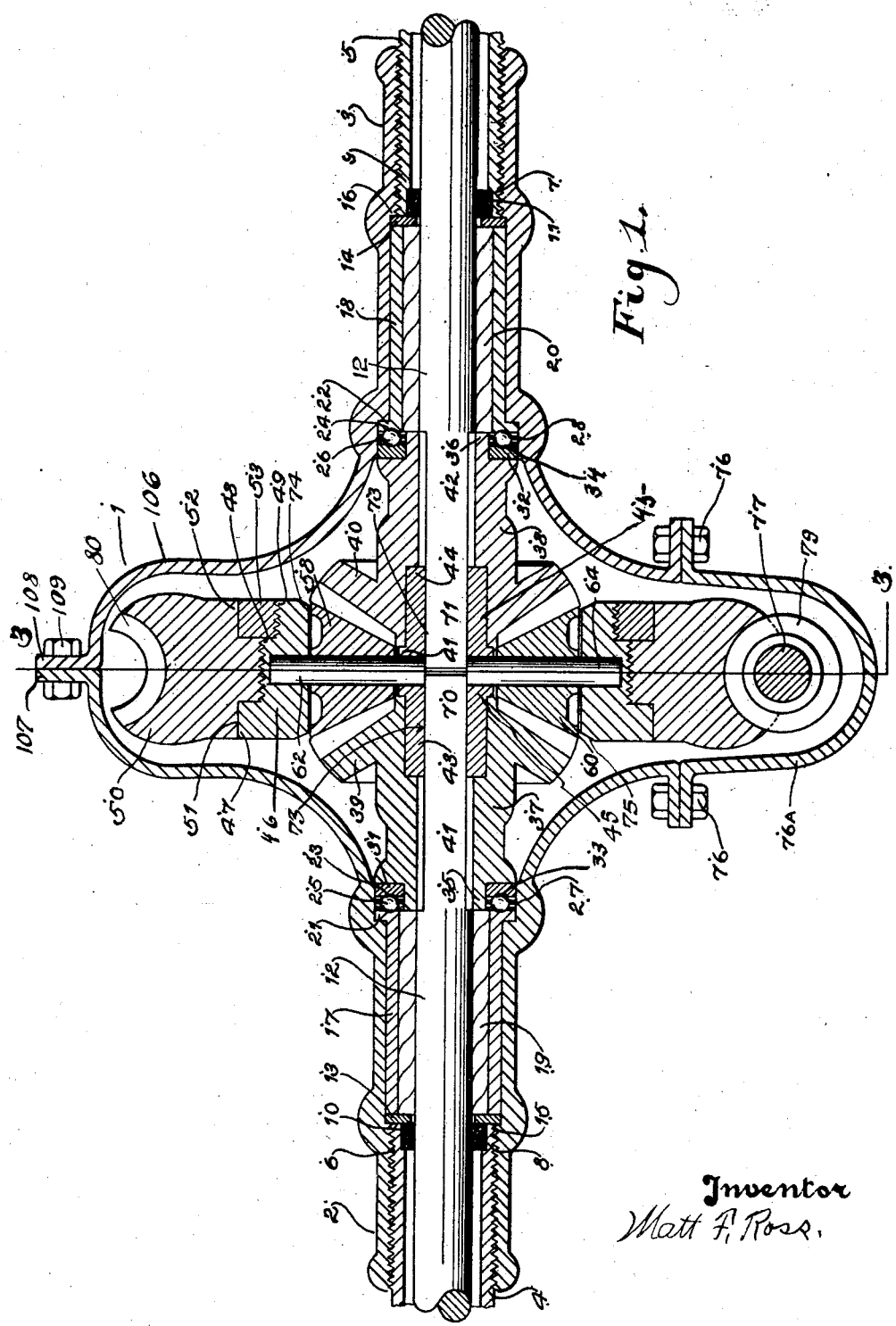

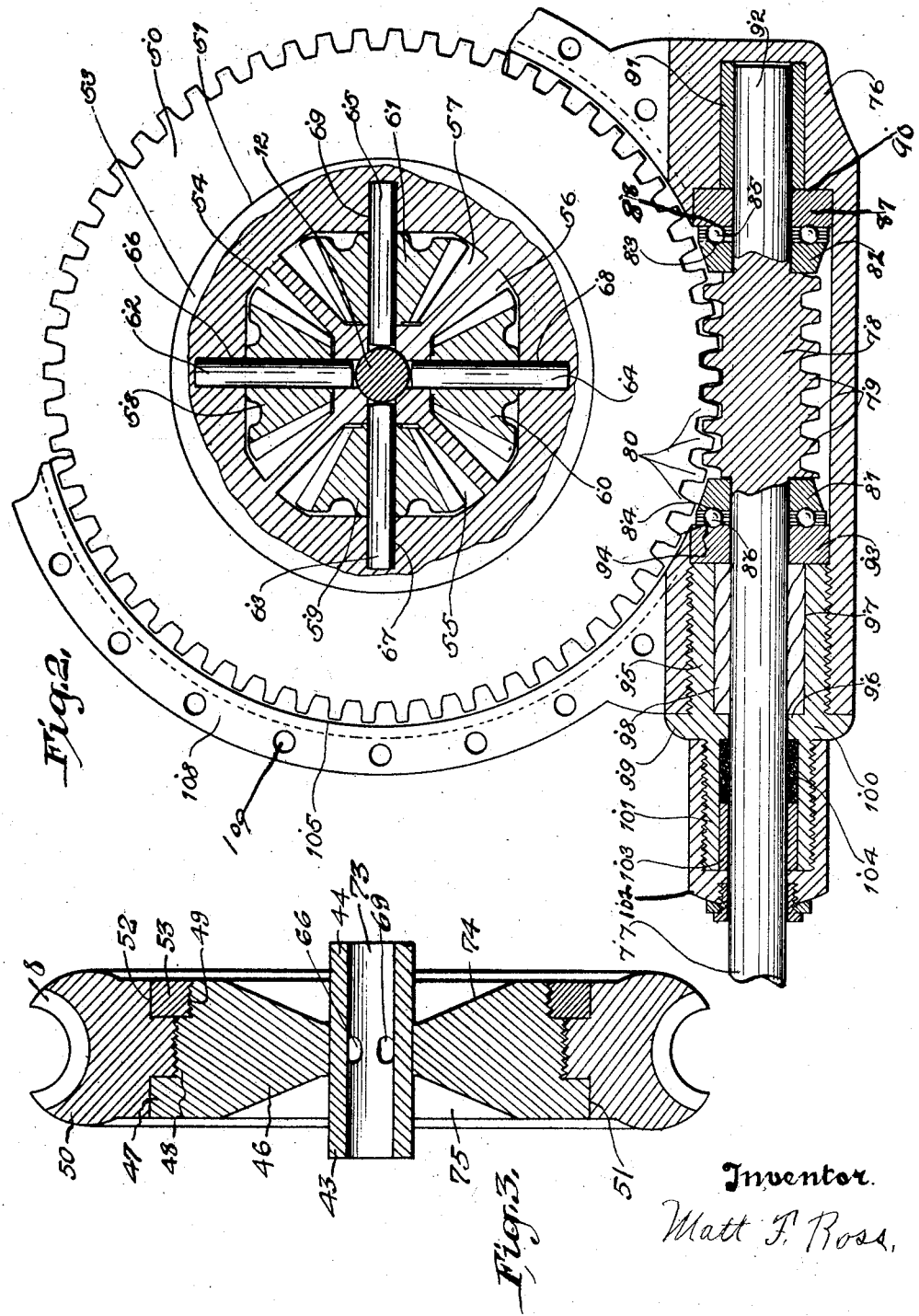

MATT F. ROSS, OF WINDFALL, INDIANA.

DIFFERENTIAL GEARING.

1,378,723.　　　　Specification of Letters Patent.　　Patented May 17, 1921.

Application filed January 20, 1919. Serial No. 272,179.

*To all whom it may concern:*

Be it known that I, MATT F. ROSS, a citizen of the United States, residing at Windfall, in the county of Tipton and State of Indiana, have invented certain new and useful Improvements in Differential Gearing, of which the following is a specification.

This invention relates to a differential gearing and has for its object to provide a worm operated differential.

Another object of the invention is to provide a differential gearing without bolts, nuts, screws, keys, rivets, cotter pins or other parts within the differential casing that may become loose or detached from the gearing.

A still further object of the invention is to provide a differential gearing in which the bearing surfaces are relatively much larger than any other such gearing heretofore made.

A further object of the invention is to provide a differential casing with a roller bearing support for an axle shaft in the casing.

With the above and other objects in view I have invented the differential and bearings illustrated in the accompanying drawings in which—

Figure 1 is a longitudinal vertical sectional view of my invention.

Fig. 2 is a section taken on line 3—3 Fig. 1.

Fig. 3 is a section of a worm gear.

Like reference characters indicate like parts throughout the following specification and in the several views in the drawings in which 1 is a differential case, screw threaded into the ends 2 and 3 of which are the axle housings 4 and 5, in the inner ends 6 and 7 of which are provided enlargements 8 and 9 to receive the felt washers 10 and 11 which surround the axle shafts 12 and form oil retainers. Steel washers 13 and 14 seat against shoulders 15 and 16 and are held in place by the roller bushings 17 and 18 and form bearings against which the outer ends of the rollers 19 and 20 run. These rollers form spaced apart center bearings in which the shafts 12 rotate. The inner ends of the bushings 17 and 18 are provided with flanges 21 and 22 having grooves 23 and 24 for the ball thrust bearings 25 and 26 said balls being mounted in retaining rings 27 and 28. The steel rings 31 and 32 having grooves 33 and 34 complete the races for said balls 25 and 26. The latter rings seat on the outer reduced ends 35 and 36 of the hubs 37 and 38 of the driver bevel gears 39 and 40. Said hubs 37 and 38 have square openings to receive the square parts 41 and 42 of the shafts. The inner ends of said hubs have enlarged round openings to receive the opposite sides 43 and 44 of hub 45 of the spider 46.

The periphery of the spider 46 is formed in three diameters, the larger 47 having a smooth surface while the intermediate 48 and smaller 49 are screw threaded. Screwed onto said threaded portion 48 by right-hand threads is a worm gear 50 having a shoulder 51 which seats upon the enlarged part 47 of the spider, and a similar shoulder 52 between which and the reduced portion 49 the lock ring 53 seats; the ring is screw threaded to the part 49 by left-hand threads. The spider 46 is provided with pockets 54, 55, 56 and 57 in which are seated bevel pinions 58, 59, 60 and 61 which are mounted upon bearing pins 62, 63, 64 and 65 mounted in bores 66, 67, 68 and 69 in the spider. The inner ends 70 and 71 of the shaft 12 are cylindrical to fit in a similar bore 73 in the hub 45. The bevel pinions 58 to 61 project beyond the beveled faces 74 and 75 of the spider 46 to engage the bevel gears 39 and 40.

Secured to casing 1 by bolts 76 is a casing 76ᵃ in which the drive shaft 77 operates. On the shaft is a worm 78 the teeth 79 of which intermesh with the teeth 80 of worm gear 50. The worm 78 is mounted between collars 81 and 82 which have grooves 83 and 84 for the ball thrust bearings 85 and 86. A ring 87 with groove 88 seats against shoulder 90 of casing 76 and forms other race member for the balls 85. A bushing 91 is mounted in the outer end of casing 76 to form bearing for end 92 of shaft 77. A ring 93 with groove 94 forming other race member for balls 86 is held in place by a bushing 95 screw threaded into the casing 76. The bushing 95 has an inwardly projecting flange 96, and a roller bearing recess 97 is provided between the flange and ring 93 for the rollers 98 which form a bearing for the drive shaft 77. The bushing 95 also is provided with an outwardly projecting flange 99 which together with flange 96 forms a head 100 for the casing 76. Projecting from head 100 is a threaded nipple 101 to carry the gland 102 which holds the packing ring 103 in place against the packing 104. The casing or housing 1 is formed in two sections 105 and 106 each having opposing flanges 107 and 108 which are held together by bolts 109. Rings 27 and 28 are provided with openings in which the balls 26 seat.

As will be noted from the above description all parts of the various members of the differential are held together by means of the various screw threaded elements of the differential gearing and no bolts, screws, nuts, pins, rivets, or other like retaining members are used which may possibly become loose and drop between the gear teeth and damage the same.

The assembling of the worm shaft and its bearings in their respective housings is extremely simple and is as follows: the long end of shaft 77 is gripped in the left hand, then race collar 82 is placed over the short end 92 of the shaft, then the ball ring 27 followed by grooved ring 87 are slipped into place on said short end of the shaft. The said short end 92 is then gripped by the left hand and the similar ball race is placed over the long end of the shaft, then the bushing or roller housing are slipped on the long end of shaft, after which the rollers 98 are put into place in said housing, then the shaft is projected into its housing, the end 92 seating in bushing 17, the housing 95 is screwed into place completing the assembling of the members without use of bolts or the like and in less time than it takes to explain.

Having now described my invention, that which I claim to be new and desire to procure by Letters Patent is:

1. A worm wheel comprising a spider reduced from a point adjacent one side to provide an enlarged side portion, the opposite side portion being further reduced to provide an abutment shoulder and the reduced portions being threaded, a worm ring screwed upon the first mentioned reduced and threaded portion of the spider and having one side portion cut to provide an annular pocket receiving the enlarged side portion of the spider, the second side portion of the worm ring being cut out to provide an annular sunken portion coöperating with the second mentioned reduced and threaded portion of the spider to form a fastener ring securing seat, and an internally threaded fastener ring fitting into said seat and screwed upon said spider.

2. In a gearing, a worm wheel having a hub extending beyond opposite sides of the wheel, the side portions of the wheel about the hub being cut to provide concaved side faces and the wheel being cut to provide radial pockets about the hub, pivot pins extending radially of the wheel in said pockets, beveled gears mounted by said pins and extending transversely of the worm wheel beyond the concaved faces, and beveled gears loosely mounted upon the hub upon opposite sides of the worm wheel and meshing with the first mentioned beveled gears.

3. In a gearing, a housing, a worm-wheel in the housing, a worm in the housing engaging the worm-wheel, the worm-wheel having hub extensions and having pockets positioned about the hub extension, pinions rotatably mounted in the pockets of the worm-wheel, driving shafts extending into the housing, bushings in the housing about the driving shafts, and gears loosely fitting upon the hub extensions of the worm-wheel and engaging said pinions, said gears having hub extensions rigid upon the driving shafts and engaging the bushings to hold the bushings in place.

In testimony whereof I affix my signature in the presence of two witnesses.

MATT F. ROSS.

Witnesses:
J. H. TRAUBERGER,
J. F. PYKE.